(12) United States Patent
Sobczak et al.

(10) Patent No.: US 11,735,076 B2
(45) Date of Patent: Aug. 22, 2023

(54) ELECTRONIC DISPLAY AND A DISPLAY MODULE, ESPECIALLY FOR SHOPPING CARTS

(71) Applicant: SOLUTION SCA SPOLKA AKCYJNA, Klaudyn (PL)

(72) Inventors: Piotr Sobczak, Blizna Jasinskiego (PL); Piotr Urban, Latchorzew (PL)

(73) Assignee: SOLUTION SCA SPOLKA AKCYJNA, Klaudyn (PL)

( * ) Notice: Subject to any disclaimer, the term of this patent is extended or adjusted under 35 U.S.C. 154(b) by 689 days.

(21) Appl. No.: 16/480,236

(22) PCT Filed: Feb. 12, 2018

(86) PCT No.: PCT/IB2018/050840
§ 371 (c)(1),
(2) Date: Jul. 23, 2019

(87) PCT Pub. No.: WO2018/150311
PCT Pub. Date: Aug. 23, 2018

(65) Prior Publication Data
US 2021/0284218 A1    Sep. 16, 2021

(30) Foreign Application Priority Data
Feb. 17, 2017  (PL) .......................... 420531

(51) Int. Cl.
*B62B 3/14*    (2006.01)
*G09F 9/30*    (2006.01)
(Continued)

(52) U.S. Cl.
CPC ............ *G09F 21/04* (2013.01); *B62B 3/1416* (2013.01); *B62B 3/1424* (2013.01); *G06F 1/16* (2013.01); *G09F 9/30* (2013.01); *G09F 23/06* (2013.01)

(58) Field of Classification Search
CPC . G09F 21/04; G09F 9/30; G09F 23/06; B62B 3/141; B62B 3/1416; B62B 3/1424; G06F 1/16
See application file for complete search history.

(56) References Cited

U.S. PATENT DOCUMENTS 4,443,961 A    4/1984  Gilroy
5,158,310 A *  10/1992 Tannehill ................ G09F 23/06
                                                    D34/27
(Continued)

FOREIGN PATENT DOCUMENTS

CN          1179755 A      4/1988
CN       201102560 Y       8/2008
(Continued)

OTHER PUBLICATIONS

Eom, Sang-Wook, "Cart Having a Media Player for Advertisement and Information", Jun. 2, 2008, Entire Document (Translation of KR 20080001494). (Year: 2008).*
(Continued)

*Primary Examiner* — Stephen S Sul
(74) *Attorney, Agent, or Firm* — SoCal IP Law Group LLP; Angelo Gaz

(57) ABSTRACT

The electronic display, especially for carts, provided with a display housing being a cart handle or being mounted on a cart handle, comprising a screen with an electronic circuit board and a power supply unit located in the display housing, according to the invention stands out in that the screen with the electronic circuit board and the power supply unit are further placed in a removable inner housing, thereby forming a separate display module. The display module is provided with a screen with an electronic circuit board and a power supply unit located in an inner housing adapted to be placed in the display housing.

15 Claims, 4 Drawing Sheets

(51) Int. Cl.
*G09F 23/06* (2006.01)
*G09F 21/04* (2006.01)
*G06F 1/16* (2006.01)

(56) References Cited

U.S. PATENT DOCUMENTS

| | | | | |
|---|---|---|---|---|
| 5,773,954 | A * | 6/1998 | VanHorn | G06K 7/10722 |
| | | | | 320/137 |
| 5,836,051 | A * | 11/1998 | Myers | B62B 3/1428 |
| | | | | 16/436 |
| 6,484,939 | B1 | 11/2002 | Blaeuer | |
| 8,136,275 | B2 * | 3/2012 | Sonnendorfer | B62B 3/1408 |
| | | | | 235/1 R |
| 8,693,174 | B2 * | 4/2014 | Chen | G06F 1/1607 |
| | | | | 345/169 |
| 10,210,503 | B2 * | 2/2019 | Sonnendorfer | G06F 13/4081 |
| 2003/0040969 | A1 * | 2/2003 | O'Hagan | G06Q 20/343 |
| | | | | 705/7.31 |
| 2003/0221283 | A1 * | 12/2003 | Myers | B62B 5/06 |
| | | | | 16/110.1 |
| 2006/0113342 | A1 * | 6/2006 | Hampton | B62B 9/26 |
| | | | | 224/42.33 |
| 2006/0254861 | A1 * | 11/2006 | Perrier | G07F 7/0627 |
| | | | | 186/26 |
| 2010/0072715 | A1 * | 3/2010 | Crum | B62B 3/1408 |
| | | | | 280/33.992 |
| 2010/0159996 | A1 * | 6/2010 | Rider | G06F 3/04886 |
| | | | | 345/173 |
| 2011/0131846 | A1 | 6/2011 | Crum | |
| 2014/0053392 | A1 * | 2/2014 | Rothkopf | H04M 1/0266 |
| | | | | 29/593 |
| 2015/0108190 | A1 * | 4/2015 | Crum | B62B 3/1408 |
| | | | | 29/428 |
| 2015/0146396 | A1 * | 5/2015 | Sorenson | H05K 13/00 |
| | | | | 29/825 |
| 2016/0064983 | A1 * | 3/2016 | Xie | H02J 7/0013 |
| | | | | 320/107 |
| 2017/0346175 | A1 * | 11/2017 | Zhao | B32B 15/20 |
| 2018/0022292 | A1 * | 1/2018 | Lowell | B60R 11/02 |
| | | | | 224/276 |
| 2019/0121396 | A1 * | 4/2019 | Ha | H01Q 1/243 |
| 2020/0156501 | A1 * | 5/2020 | Irwin | B60L 58/14 |

FOREIGN PATENT DOCUMENTS

| | | | | | |
|---|---|---|---|---|---|
| CN | 101572043 | A | | 11/2009 | |
| CN | 201410978 | Y | | 2/2010 | |
| CN | 101669159 | A | | 3/2010 | |
| CN | 203562049 | U | | 4/2014 | |
| CN | 104903950 | A | | 9/2015 | |
| CN | 204688176 | U | | 10/2015 | |
| CN | 204775387 | U | | 11/2015 | |
| CN | 204791823 | U | | 11/2015 | |
| CN | 105323197 | A | | 2/2016 | |
| CN | 105605379 | A | | 5/2016 | |
| CN | 105679774 | A | | 6/2016 | |
| EP | 1031936 | A2 | | 8/2000 | |
| EP | 1344705 | A1 | | 9/2003 | |
| EP | 2012296 | A3 | | 3/2010 | |
| FR | 2 623 154 | A3 | | 5/1989 | |
| JP | S63 135991 | A | | 6/1988 | |
| KR | 20080001494 | U | * | 6/2023 | B62B 3/1428 |
| PL | 175035 | B1 | | 10/1998 | |
| WO | 2007002941 | A1 | | 1/2007 | |
| WO | 2018/150311 | A1 | | 8/2018 | |

OTHER PUBLICATIONS

European Patent Office/ISA, Written Opinion of the International Search Authority for PCT Application No. PCT/IB2018/050840, dated Jun. 4, 2018.

European Patent Office/ISA, International Search Report for PCT Application No. PCT/IB2018/050840, dated Jun. 4, 2018.

Patent Office of the Republic of Poland, Search Report for Application No. P.420531, dated Nov. 17, 2017.

CNIPA, 1st Office Action for Chinese Patent Application No. 201880005128.3, dated Sep. 25, 2020. 8 pages.

CNIPA, 2nd Office Action for Chinese Patent Application No. 201880005128.3, dated Jan. 14, 2021. 6 pages.

CNIPA, 3rd Office Action for Chinese Patent Application No. 201880005128.3, dated Jul. 2, 2021. 7 pages.

European Patent Office, Office Action for European Patent Application No. 18707758.1, dated Jul. 30, 2021.

* cited by examiner

ELECTRONIC DISPLAY AND A DISPLAY MODULE, ESPECIALLY FOR SHOPPING CARTS

RELATED APPLICATION INFORMATION

This application claims priority to International PCT Application No. PCT/IB2018/050840, with an international filing date of Feb. 12, 2018, entitled "AN ELECTRONIC DISPLAY AND A DISPLAY MODULE, ESPECIALLY FOR TROLLEYS," which claims priority from Polish Patent Application No.: P.420531 filed Feb. 17, 2017, the disclosures and figures of which are incorporated by reference as if set forth herein in their entirety.

BACKGROUND

Field of the Invention

The subject of the invention is an electronic display and a display module, especially for carts, such as shopping carts, carts to carry luggage at airports and other, such as warehouse carts or golf carts. Displays of this kind are used for presenting information such as messages, advertisements, prices of products, etc.

Description of the Related Art

Devices for presenting information on shopping carts are known in the state of the art. For example, specification of the German utility model No. DE8601412U1 discloses a device for presenting information mounted on a shopping cart handle. The device comprises an area for information medium, usually printed paper, and a window through which information from the information medium is visible to the cares user. The structure of the device allows relatively easy replacement of the information medium with another one, carrying another information. A similar solution is disclosed in US patent application No. US2003/0221283A1 entitled "Trolley handle". Also, in this case, information medium is a paper placed under a window closed with a cover protecting against possible manipulation by unauthorized persons.

In newer solutions, such as a solution disclosed in US patent application No. US2006/0254861A1 entitled "Electronic shopping cart handle", information is presented by means of an electronic display having handles shaped like a trolley handle and forming a trolley handle or being mounted on a trolley handle. In such case, change of the displayed information may be performed quickly and the content may be richer in information than medium in the form of a replaceable piece of paper. However, these benefits are obtained at the cost of increased failure rate of displays and therefore of carts.

Presenting information on shopping carts requires many technical problems to be solved. Carts are subjected to serious mechanical and climatic exposures, so they must meet very strict technical requirements. In addition, mechanical structure of carts is not standardized, so devices for presenting information also must have various forms or even colors, depending on the type of cart they are used with. That means increase of production costs. Contemporary requirements concerning speed and types of presentation enforce the use of electronic means, which are sensitive to climatic exposures and require effective (thus fast) service. The object of the invention is to solve the above problems.

BRIEF SUMMARY OF THE INVENTION

The electronic display, especially for shopping carts, provided with a display housing being a trolley handle or being mounted on a trolley handle, comprising a screen 14 with an electronic circuit board and a power supply unit located in the display housing, said display housing being provided with a window, according to the invention stands out in that the screen with the electronic circuit board and the power supply unit are further placed in a removable inner housing matching the interior of the display housing, thereby forming a separate display module. At least a part of the inner housing of the display module is at least partially transparent and this transparent part of the inner housing of the display module protrudes from the inner housing and is at least partially located in the area of the window of the display housing. The display module is provided with at least one data transmission unit and an electrical connector, while the display housing comprises an access opening for the electrical connector.

In one preferred embodiment the window of the display housing is provided with a pane and the transparent part of the inner housing of the display module is preferably at least partially located under the pane of the window of the display housing, with a certain distance from the pane.

Preferably, spacing elements 7 fixing the minimal distance between the transparent part of the inner housing of the display module and the pane of the window of the display housing are placed between the inner housing of the display module and the pane of the window of the display housing.

The spacing elements 7 fixing the minimal distance between the transparent part of the inner housing of the display module and the pane of the window of the display housing constitute preferably ribs, located on the inner housing of the display module.

In another preferred embodiment the spacing elements fixing the minimal distance between the transparent part of the inner housing of the display module and the pane of the window of the display housing are spacers 7 located in the display housing.

The pane of the window of the display housing constitutes preferably a removable cover.

The fixed minimal distance between the transparent part of the inner housing of the display module and the pane of the window of the display housing is preferably in the range of 0.1 to 50 mm.

The display module, especially for shopping carts, according to the invention stands out in that said module is provided with a screen with an electronic circuit board and a power supply unit located in an inner housing which is provided with at least one data transmission unit and an electrical connector, accessible from the outside. The inner housing is adapted to be placed in the display housing, the display housing being a cart handle or being mounted on a cart handle and being provided with a window. At least a part of the inner housing of the display module is at least partially transparent, while transparent part of the inner housing protrudes from the inner housing.

The connector may be used to supply power to components of the display or for battery charging, but it may also be a multipurpose connector allowing e.g. data transmission.

According to the preferred embodiment the inner housing is provided with spacing elements fixing the minimal distance between the transparent part of the inner housing of the display module and the pane of the window of the display housing.

The spacing elements fixing the minimal distance between the transparent part of the inner housing of the display module and the pane of the window of the display housing constitute preferably ribs located on the inner housing of the display module.

The screen with the electronic circuit board and the power supply unit are preferably separate units, located in the inner housing of the display module. Preferably, at least one of the electronic circuit board and the power supply unit is covered with a protective coating. The power supply unit preferably comprises at least one rechargeable battery 10.

In the preferred embodiment the display module is provided with at least one cart positioning unit 9. Preferably, at least one cart positioning unit is a GSM unit 9. The use of the GSM unit to determine cart position allows localization of lost carts in a large area.

In the preferred embodiment the display module is provided with at least one data transmission unit and at least one data transmission unit is preferably a GSM unit.

Preferably, the display module is provided with a proximity identification tag. It may be a near field communication tag (NFC tag) or/and a radio frequency identification tag (RFID tag). The use of the NFC and/or RFID identification system enables the selection of a dedicated message for individual users.

The solution according to the invention simplifies fixing of electronic displays and simultaneously reduces the risk of damage. In extreme cases, it also makes possible further exploitation of carts with damaged display, because the cart with the display module removed and sent to the service may still be used, although with limited functionality. In addition, the manufacturing costs are reduced because only display housings with accompanying elements, such as adapters and connectors, have to be diversified, while the basic and the most expensive part of the display, i.e. the display module, may be the same in each supermarket chain and in each object where the carts are used.

DESCRIPTION OF THE DRAWINGS

The embodiments of the present invention are shown in accompanying the drawings, wherein.

DETAILED DESCRIPTION

Figure 1:
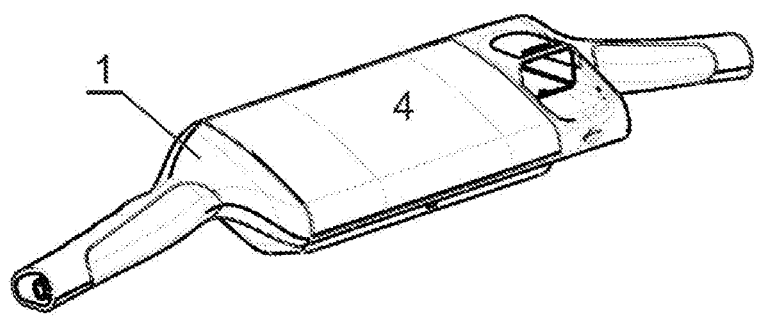
FIG. 1 is a general perspective view of the electronic display of the present invention in an assembled form.

FIG. 1 shows an embodiment of the electronic display in the assembled form. In particular, the figure shows the outer housing 1 with window 4 through which displayed information is visible to the user of the cart. The outer housing comprises arms that can be a structural element (handle) of the cart or can be attached with a set of adapters to any kind of cart. Such solutions are known in the state of the art.

Figure 2:
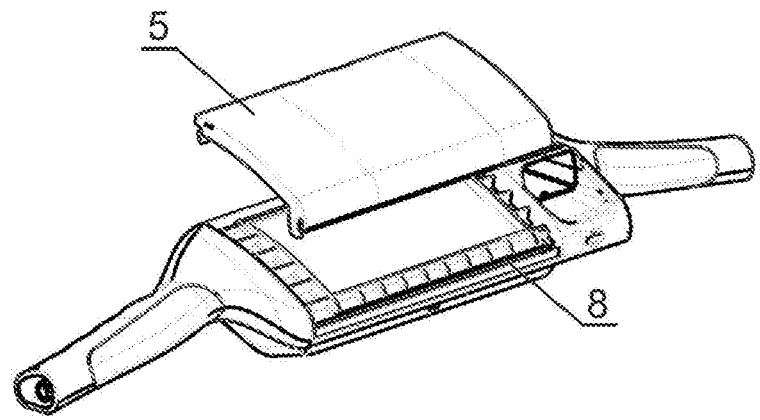
FIG. 2 is a perspective view of the embodiment of the electronic display according to the present invention having housing with pane and with the display module inserted into the housing.

Inside the display housing 1 a display module 8 is located, matched to the shape of the interior of the housing 1. The display module 8 can be attached to the display housing 1 with screws or fasteners (e.g., at locations 16 of FIG. 3) or in any other way allowing fast replacement of the faulty module with a new one. In the embodiment of FIG. 2, the window of the housing occupies the whole area above the display module and is covered with a pane 5 forming a flap closing the housing 1 and attached to the housing with hinges and latches. In alternative solutions another way of attaching the pane is possible and the pane can be smaller than the top surface of the display module.

Figure 3:
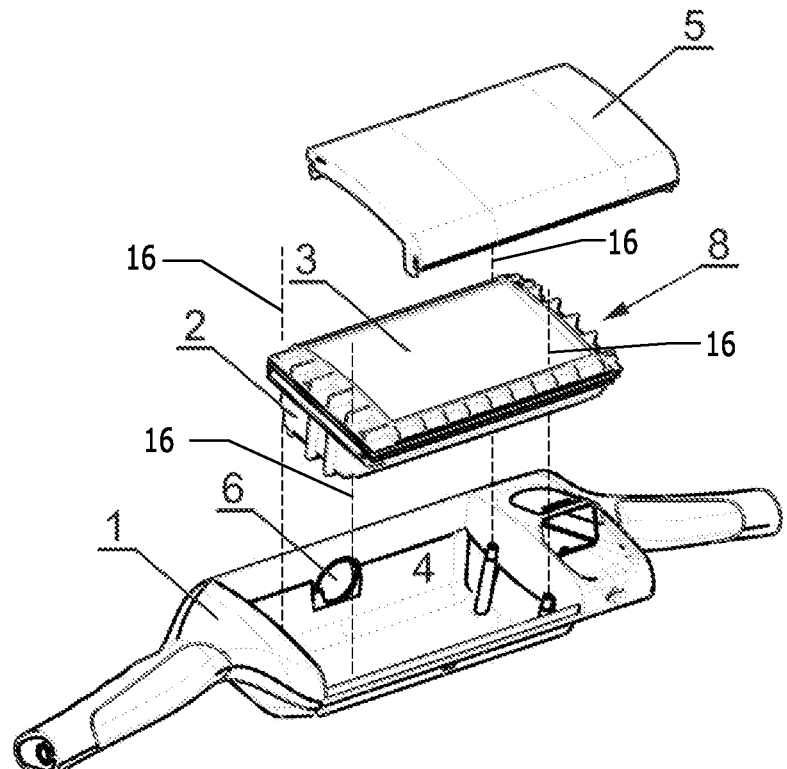
FIG. 3 is an exploded view of the display of FIG. 2.

FIG. 3 shows components of the display according to the embodiment of FIG. 2. In this embodiment, the transparent part 3 of the inner housing 2 of the display module is protected with the pane 5 closing the housing 1. In order to reduce probability of damage of the display module when the cart is used, a distance between the pane 5 closing the housing 1 and the transparent part 3 of the inner housing 2 of the display module 2 is maintained. The minimal distance is determined by the size of ribs 7 integrated with the transparent part 3 of the inner housing 2 and produced together with it in the same injection molding process. The display housing 1 is provided with an opening 6 through which an electrical connector 11 is led out when the display module 8 is in the housing 1.

Figure 4:
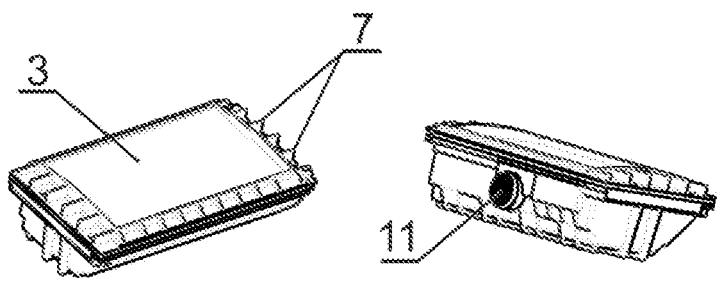
FIG. 4 is a perspective view of the embodiment of the display module with ribbed transparent part of the inner housing.

FIG. 4 shows the first embodiment of the display module 8. The walls of the housing are reinforced with ribs, because the structure of the module must meet high mechanical resistance requirements. Ribs 7, located on the transparent part of the housing, fulfill a dual role—they stiffen the upper part of the housing of the module and assure the distance between the transparent part 3 of the housing of the display module and the pane 5 of the display housing. Such a solution reduces the probability of damage of the expensive display module in case the pane 5 of the display housing is crushed. The only protruding element of the inner housing of the display module, exposed to possible damage, is the electrical connector 11. The shape of the inner housing of the display module and its reinforcements are selected so as to stiffen and strengthen the entire structure of the display mounted on a cart.

Figure 5:
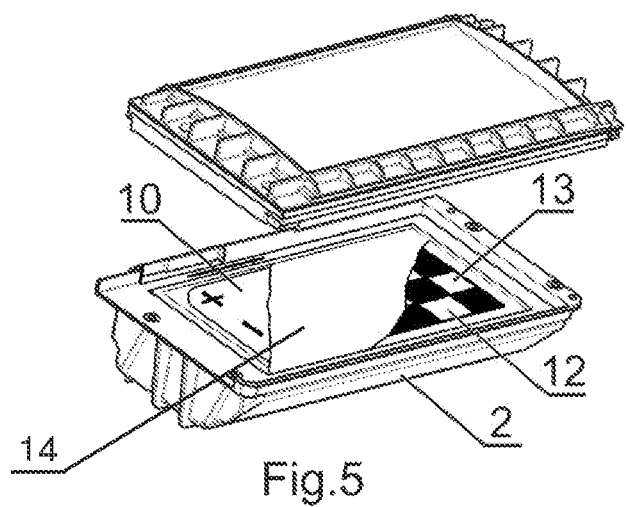
FIG. 5 is an exploded perspective top view of the display module of FIG. 4.
Figure 6:
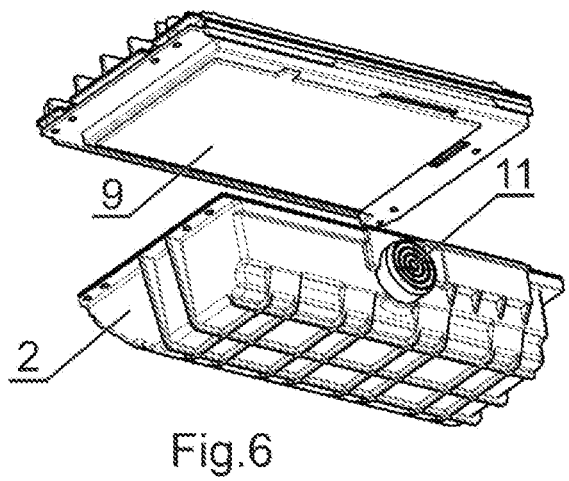
FIG. 6 is an exploded perspective bottom view of the display module of FIG. 4.

FIG. 5 and FIG. 6 show the internal structure of the display module according to the above embodiment. The inner housing 2 of the display module consists of two parts, the bottom one and the top one, connected with screws. In the bottom part of the inner housing 2 of the display module there is a power supply unit 10, a data transmission unit 12 and a proximity identification tag 13, all of them covered with a protective coating. The upper part of the housing contains a screen 14 with an electronic circuit board 9. Both parts are replaceable in order to facilitate service.

Figure 7:
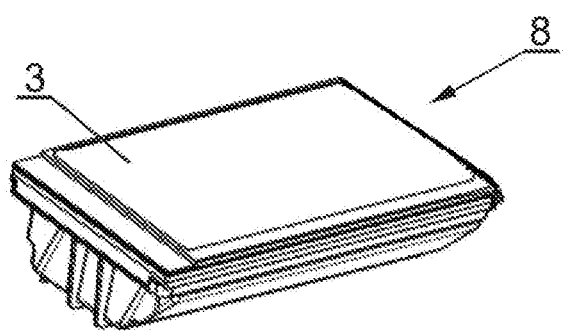
FIG. 7 illustrates the embodiment of the display module adapted for mounting in the housing with spacers.

FIG. 7 shows another embodiment of the display module. The internal structure of this module is the same as the structure of the module of FIG. 5 and FIG. 6. The only difference is that there are no ribs in the upper part of the housing, because the required protective space above the transparent part of the inner housing of the display module is assured with spacers placed in the display housing. In this embodiment, spacers are provided on the inner part of the pane of the window of the display housing, but other solutions are also possible.

Figure 8:
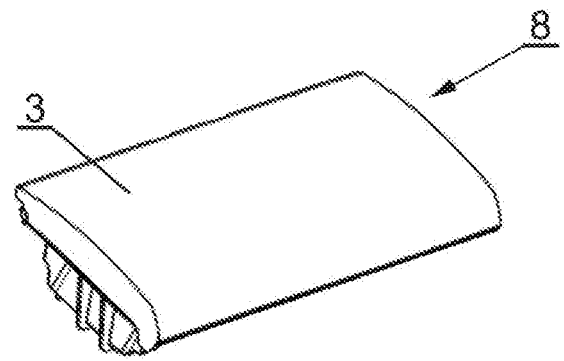
FIG. 8 is a perspective view of the display module with protruding transparent part of the inner housing, adapted for mounting in the display housing without pane.

FIG. 8 shows an example of the display module intended for cooperation with the display housing 1 which is open, i.e. does not comprise pane. In this embodiment, the transparent part 3 of the inner housing of the display module is additionally reinforced, preferably double-layered, and made of scratch-resistant material.

The solution according to the invention reduces problems related to the use of electronic displays in difficult operating conditions. This has been achieved by means of replaceable display module which significantly simplifies service. If the electronics fail, the staff of the facility where the carts are used can replace display module without calling specialized service and withdrawing the cart from operation. In case of vandalism and mechanical damage, the most expensive component of the display, i.e. the display module, is protected against damage, and only relatively cheap plastic elements have to be replaced. The displays according to the invention can have many various outer forms and colors, adapted to technical requirements and aesthetic expectations of users, while the display modules are standardized, which reduces production and service costs.

The above description of the embodiments serves for illustration purposes of the inventive concept only and in no circumstances constitute a limitation of the scope of the patent protection, which is defined in the following patent claims.

The invention claimed is:

1. An electronic display for shopping carts, comprising:
   a display housing being one of a cart handle or mountable on the cart handle;
   a screen with an electronic circuit board and a power supply unit located in the display housing, the display housing being provided with a window;
   the screen with the electronic circuit board and the power supply unit are further placed in a removable inner housing matching an interior of the display housing, the screen with the electronic circuit board, the power supply unit and the removable inner housing forming a separate display module attached to the display housing with screws, wherein the display housing is standardized to be the same for a plurality of supermarket chains, wherein the separate display module is standardized to be the same for a supermarket chain of the plurality of supermarket chains and is adapted to survive mechanical and climate exposure;
   wherein at least a part of the removable inner housing of the separate display module is at least partially transparent and is a transparent part of the removable inner housing of the separate display module protrudes upwards from the electronic circuit board and is at least partially located in an area of the window of the display housing;
   wherein the window of the display housing is provided with a pane, wherein the pane protects the separate display module in order to reduce a probability of damage of the separate display module when the cart is used based on a maintained distance between the pane and the transparent part, and wherein the maintained distance is between 0.1 mm and 50 mm;
   wherein the separate display module is provided with at least one data transmission unit and an electrical connector; and
   the display housing comprises an access opening for the electrical connector.

2. The electronic display according to the claim 1, the transparent part of the removable inner housing of the separate display module is located, at least partially, under the pane of the window of the display housing, at a maintained distance from the pane.

3. The electronic display according to the claim 2, further comprising spacing elements fixing the maintained distance between the transparent part of the removable inner housing of the separate display module and the pane of the window of the display housing, the spacing elements placed between the removable inner housing of the separate display module and the pane of the window of the display housing.

4. The electronic display according to the claim 3, wherein the spacing elements fixing the maintained distance between the transparent part of the removable inner housing of the separate display module and the pane of the window of the display housing comprises ribs, located on the removable inner housing of the separate display module.

5. The electronic display according to the claim 3, wherein the spacing elements fixing the maintained distance between the transparent part of the removable inner housing of the separate display module and the pane of the window of the display housing comprises spacers, located in the display housing.

6. The electronic display according to the claim 1, wherein the pane of the window of the display housing comprises a removable cover.

7. A display module for shopping carts, comprising:
   a screen with an electronic circuit board and a power supply unit located in an inner housing;
   the inner housing is provided with at least one data transmission unit and an electrical connector, accessible from an outside, the inner housing being adapted to be placed in a display housing, the display housing being a cart handle or being mountable on a cart handle and being provided with a window, at least a part of the inner housing of the display module being a transparent part, the transparent part of the inner housing protruding upward from the electronic circuit board, wherein the display housing is standardized to be the same for a plurality of supermarket chains, wherein the display module is standardized to be the same for a supermarket chain of the plurality of supermarket chains and is adapted to survive mechanical and climate exposure, wherein the display module is adapted to be attached to the display housing with screws;
   wherein the window of the display housing is provided with a pane, wherein the pane protects the display module in order to reduce a probability of damage of the display module when the cart is used based on a maintained distance between the pane and the transparent part, and wherein the maintained distance is between 0.1 mm and 50 mm.

8. The display module according to the claim 7, wherein the inner housing is provided with spacing elements, fixing the maintained distance between the transparent part of the inner housing of the display module and the pane of the window of the display housing.

9. The display module according to the claim 8, wherein the spacing elements fixing the maintained distance between the transparent part of the inner housing of the display module and the pane of the window of the display housing comprises ribs located on the inner housing of the display module.

10. The display module according to the claim 7, wherein the screen with the electronic circuit board and the power supply unit are separate units, located in the inner housing of the display module.

11. The display module according to the claim 10, wherein the power supply unit comprises at least one rechargeable battery.

12. The display module according to the claim 7, wherein the display module is provided with at least one trolley positioning unit.

13. The display module according to the claim 12 wherein the at least one trolley positioning unit is a GSM unit.

14. The display module according to the claim 7 wherein the at least one data transmission unit is a GSM unit.

15. The display module according to the claim 7 the inner housing further comprising a proximity identification tag.

\* \* \* \* \*